Figure 1:
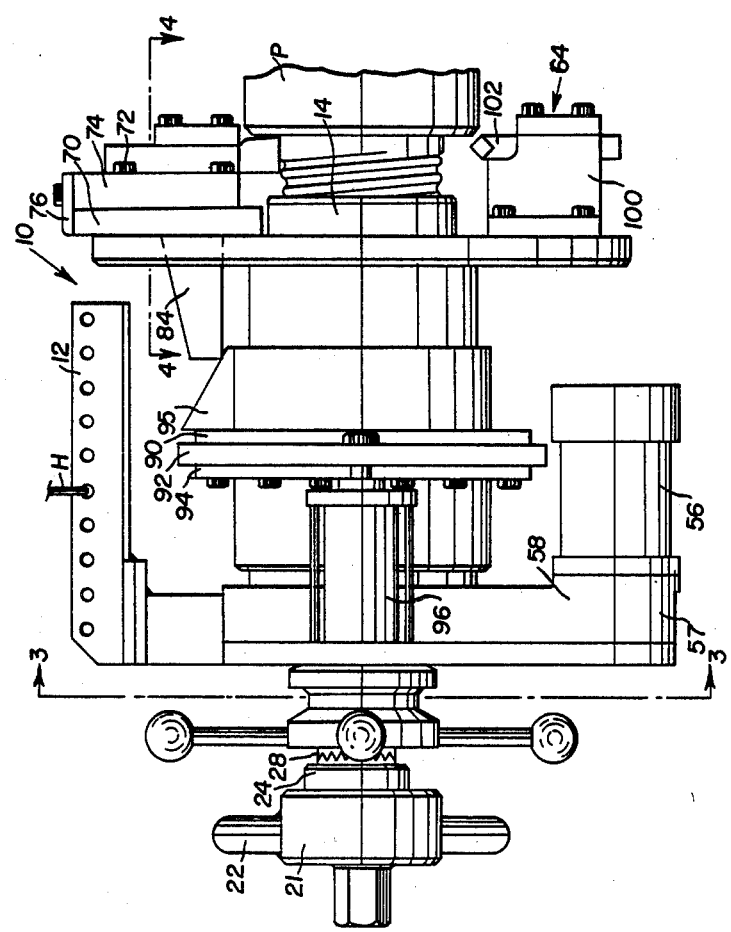

United States Patent [19]

Blattler

[11] 4,149,436
[45] Apr. 17, 1979

[54] MACHINE FOR FACING SEAL FACES OF PIPES

[76] Inventor: Joseph F. Blattler, Suite 302, 10405 Saskatchewan Dr., Edmonton, Alberta, Canada

[21] Appl. No.: 860,171

[22] Filed: Dec. 13, 1977

[51] Int. Cl.$^2$ ............................................. B23B 5/16
[52] U.S. Cl. ...................................... 82/4 C; 144/205
[58] Field of Search ........................... 82/4 C; 144/205

[56] References Cited

U.S. PATENT DOCUMENTS

| 3,124,024 | 3/1964 | Pittman | 82/4 C |
| 3,181,398 | 5/1965 | Rogers | 82/4 C |
| 3,733,939 | 5/1973 | Paysinger et al. | 144/205 |

FOREIGN PATENT DOCUMENTS 731902   4/1966   Canada ........................................ 82/4 C Primary Examiner—Leonidas Vlachos
Attorney, Agent, or Firm—Spencer & Kaye

[57] ABSTRACT

Apparatus for machining the seal faces of drill pipes having an adapter which screws onto a drill pipe, the adapter carrying a spindle non-rotatably supporting a sleeve which in turn supports a rotary tool head having a radially movable tool for facing the seal face of the drill pipe. The sleeve has support means solid therewith which carry a hydraulic motor geared to rotate the tool head, and the support means also carries the rear ends of hydraulic cylinders which cause radial feeding of the tool via a wedging mechanism. Special means are provided for solidly locking the adapter within the spindle after the adapter has been screwed onto a pipe end, and for adjusting the axial position of the tool head relative to the pipe.

11 Claims, 5 Drawing Figures

MACHINE FOR FACING SEAL FACES OF PIPES

The present invention provides apparatus for machining seal faces of pipe ends, and is especially useful for refacing the shoulders or ends of threaded pipes, for example drill pipes.

Drill pipes have threaded ends which can be screwed together to form a long string of drill piping. The seal between adjacent pipes is provided between a shoulder on the male or pin end of a pipe and the annular end face of the female or box end of the next pipe. These seal faces often become damaged in the field and require machining.

At present, such machining can be done in the field by a rather cumbersome lathe type of apparatus. Also, it has been proposed for example according to Canadian Patent No. 938,473, issued Dec. 18, 1973 to Massey, to provide a small hand operated tool for this purpose, which may however be adapted for operation by a power hand tool.

The present invention provides a machine which is fairly small and portable, and yet which is power driven both for rotating the tool holder and for automatically feeding the tool during facing. The feeding of the tool can be controlled independently of the rotation of the tool, unlike with the lead screw kind of apparatus described in Canadian Patent No. 938,473. The machine of this invention is particularly suitable for refacing a large number of drill pipes in a short time, in the field. The machine utilizes radial feed of a surfacing tool and is thus useful for wide seal faces.

The basic features of apparatus in accordance with the invention are spindle means including an adapter, the adapter having a forward end arranged to engage a pipe end so as to hold the spindle means solid with the pipe, support means non-rotatably held on the spindle means, bearing means carried by the spindle means and in turn supporting a hollow shaft carrying a rotary tool head, the tool head having a tool holder movable radially thereof, under control of feeding means, and drive means mounted on the support means for rotating the rotary tool head.

In accordance with the preferred embodiment, a sleeve is provided axially adjustable on the spindle means, without rotation, and the said bearing means is carried by the sleeve. The support means are also carried by the sleeve and extend outwardly therefrom at the rear end of the bearing means, and the support means carry one end of the feeding means used to move the tool holder radially of the tool head.

Also in accordance with the preferred embodiment, a motion transmitting member is mounted on the hollow shaft, being rotatable therewith and movable axially thereon, and a non-rotatable slip ring engages with the motion transmitting member for causing axial movement of this member, the slip ring being connected to the support means by hydraulic cylinder means so that the latter means can cause axial movement of the motion transmitting member. A mechanism, which may be a wedging mechanism, interconnects the member with the tool holder so that axial movement of the member is converted into radial movement of the tool holder.

Also in accordance with the preferred embodiment, the spindle means includes a hollow spindle surrounding the adapter, the adapter having a screw threaded end portion arranged to engage the threads of a drill pipe, and being rotatable in the spindle for screwing the adapter onto or into a non-rotating pipe, the spindle means further comprising locking means at the rear end of the spindle for solidly locking the adapter within the spindle when the adapter is in place on a pipe. The locking means preferably comprise a locking nut threaded onto a screw thread at the rear end of the adapter, and an axially movable clutch ring keyed to the adapter and positioned between the locking nut and the end of the spindle, the clutch ring and the rear end of the spindle having co-operating teeth to prevent rotation of the clutch ring and adapter relative to the spindle when the clutch ring is held against the end of the spindle by the locking nut, with the forward end of the spindle located by the forward end of the adapter.

Figure 2:
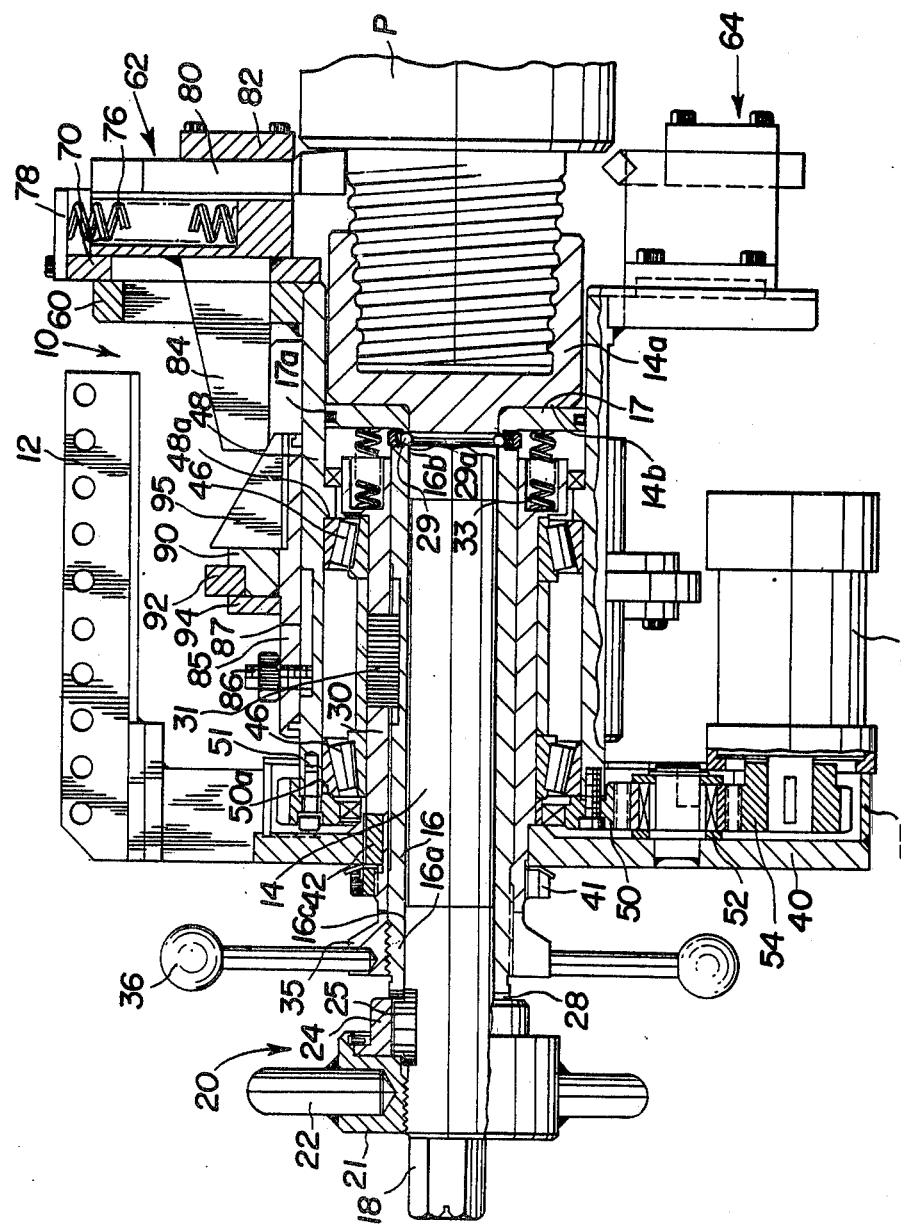
Figure 3:
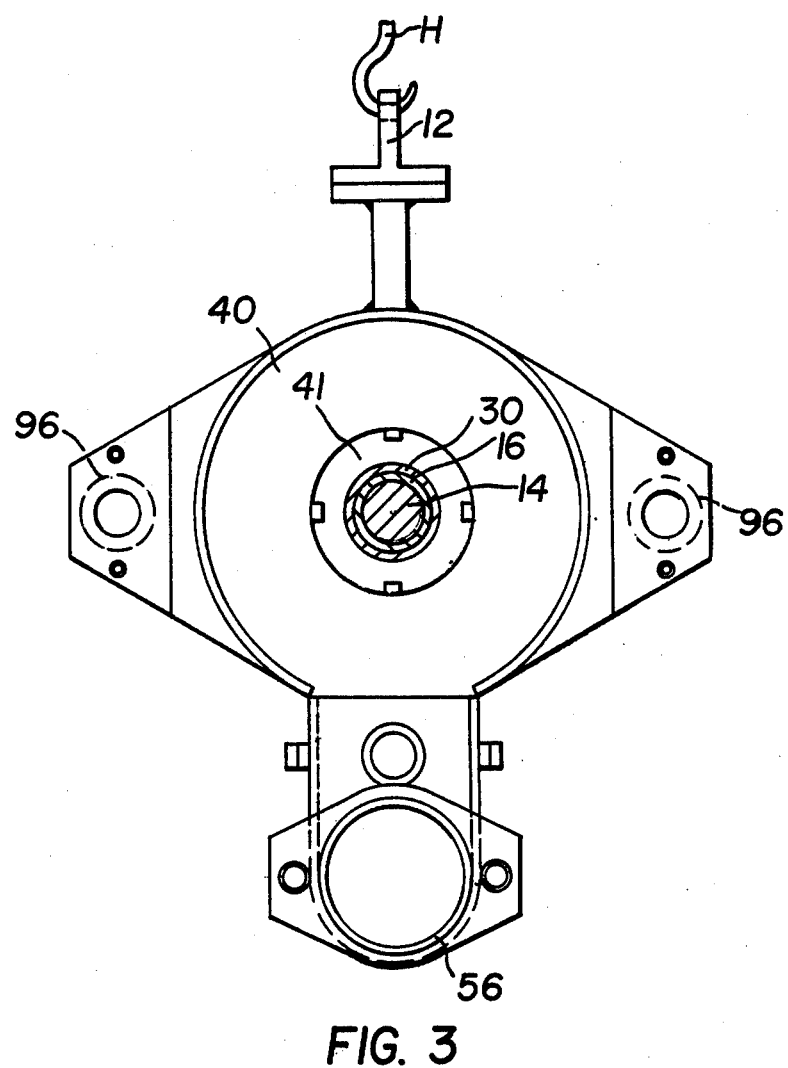
Figure 5:
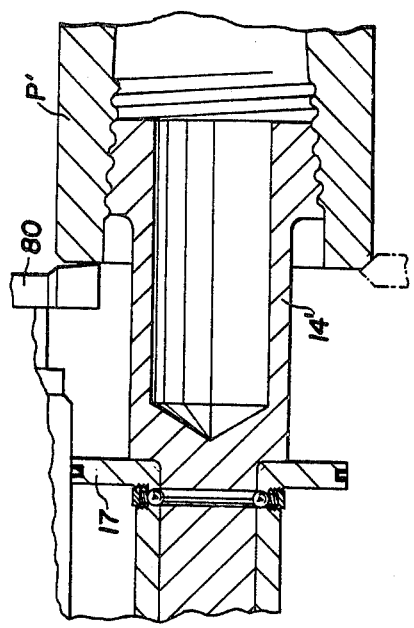
Figure 4:
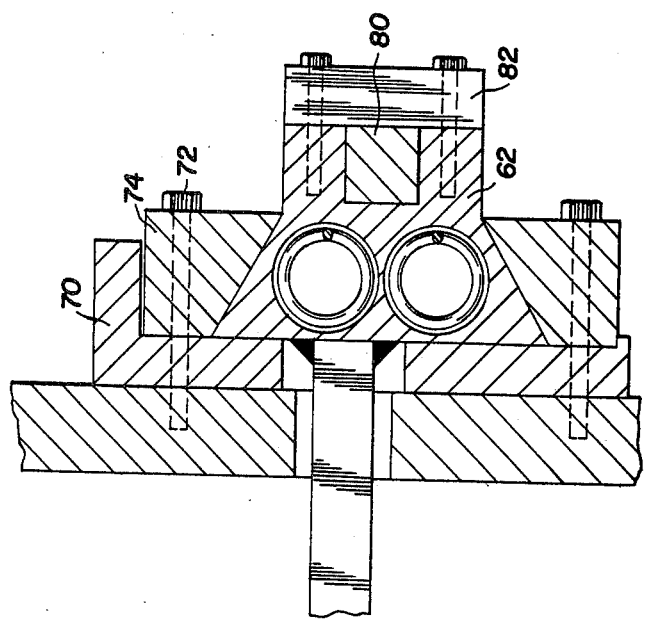

The invention will now be more fully described with reference to the accompanying drawings, in which:

FIG. 1 shows a side view of the machine in place on the pin end of a drill pipe, FIG. 2 shows a view similar to FIG. 1, but enlarged and partly sectioned, FIG. 3 shows a view of the machine on line 3—3 of FIG. 1, FIG. 4 shows a view of the tool holder and associated parts on line 4—4 FIG. 1, and FIG. 5 shows a fragmentary view of an adapter end portion screwed onto the box end of a drill pipe.

Referring to FIGS. 1 to 4 of the drawings, the machine 10 is shown in operating position on the pin end of pipe P, which is supported non-rotatably and in horizontal position by a rack not shown. Although the machine is supported by the pipe end to be rigid therewith, additional support is provided by a suspension hook H which holds a support bar 12 of the machine at a position close to its centre of gravity. The hook H provides temporary support while the machine is being uncoupled from one pipe and coupled to the next, and is preferably in the form of a spring suspension allowing an operator easily to adjust the vertical position of the machine for variations in pipe position.

The pipe P is engaged by an adapter 14 having a solid shank and an enlarged front end portion 14a with an internal tapered thread suited to the thread of pipe P. The shank of adapter 14 extends through and supports a hollow spindle 16, this spindle having machined internal surfaces 16a and 16b which fit close around the adapter. Spindle 16 includes a flange 17 abutting the rearward facing flange surface 14b of the front end portion 14a of the adapter. The adapter is rotatable within the non-rotatable spindle 16 to allow this to be threaded onto the end of a non-rotating pipe, and the rear end of the adapter is provided with flats 18 to which a wrench can be applied to tighten the adapter in place. When the adapter has been so tightened, it can be locked within the spindle by a locking mechanism indicated generally at 20 in FIG. 2.

The locking mechanism 20 includes a locking nut 21 threaded onto a screw thread at the rear end of the adapter, and having radial spokes 22 which can be used for tightening the locking nut. Positioned between the locking nut and the rear end of spindle 16 is an axially movable clutch ring 24, keyed against rotation about the adapter by a key 25. A circlip held by a surrounding portion of the lock nut 21 engages an enlarged rear end of the clutch ring 24 to insure that this clutch ring always moves axially with the locking nut 21. The front end of the clutch ring 24, and the rear end of spindle 16, are provided with teeth 28 of triangular form, so that when the locking nut is rotated to move the clutch ring 24 forwards against the rear end of the spindle, this both presses the front end flange 17 of the spindle against the flange surface 14b at front end portion of the adapter, and in addition the teeth 28 prevent any rotation occurring between the spindle and the adapter.

Detent means in the form of a ball 29 spring biased into a circumferential groove 29a in the adapter tend to hold the spindle in its forward, locked position on the adapter, and thus ensures that the teeth 28 on the spindle clear those on the clutch ring when the latter is withdrawn by rotation of locking nut 21.

The spindle 16 has a machined outer surface carrying a sleeve 30 which is adjustable axially of the spindle but prevented from rotating thereon by key 31. The coacting surfaces of the spindle and sleeve are closely machined to prevent any play between these parts. The front end of sleeve 30 is enlarged and provided with axial recesses which receive springs 33 acting against the rear end of flange 17. The sleeve is axially adjustable against the force of springs 33 by an adjustment nut 35 which rotates on a threaded rear end portion 16c of the spindle, this nut having radial handles 36 for easy rotation. As will appear, the axial position of the nut 35 and sleeve 30 determine the axial position of the tools relative to the adapter, and thus precisely locate the tools relative to the threads of pipe P. A scale is preferably provided on the adjacent parts of nut 35 and sleeve 30 so that the position of the tools can be read off according to the position of adjustment nut 35 without the operator needing to observe the front end of the machine.

Sleeve 30 carries at its rear end support means in the form of a back plate 40, the shape of which is shown in FIG. 3, and which has a bore received on a reduced diameter portion of sleeve 30, being held in place a locking nut 41 and being also held against rotation on the sleeve by key 42. The top of plate 40 carries the support bar 12 already referred to.

From the description so far it will be understood that when the adapter is firmly screwed in place on the pipe P, and the locking nut 21 is tightened, the key 25 and teeth 28 (and friction between surface 14a and spindle flange 17), prevent rotation of the spindle on the adapter, and keys 31 and 42 prevent any rotation of the sleeve or back plate 40 on the spindle, so that all of these parts are locked against rotation. The various locking means are sufficient to transmit the rotary machining forces which would otherwise tend to rotate the back plate 40 relative to the pipe P. The central portion of sleeve 30 carries bearing means including two rings of tapered roller bearings 46, which rotatably support a hollow shaft 48. The outer portion of front bearing ring 46 is located against a shoulder 48a of the hollow shaft, and the outer rear bearing ring is held in place by a protruding annular portion 50a of a gear ring 50 held by screws 51 on the rear end of shaft 48. These parts are dimensioned so that there is no play between the rotatable shaft 48 and the sleeve 30. The gear ring 50 is rotated by an idling pinion 52 held on a stub shaft protruding from back plate 40, this pinion engaging with a gear wheel 54 of a hydraulic motor 56 which is mounted on the bottom of the base plate 40. The motor is mounted so as to extend forwardly, by a curved support plate 57 which partially surrounds gear 54, so that gear 54 is at the rear end of the motor and all gears are close to plate 40 and can be conveniently enclosed by cover 58.

The front end of the hollow shaft 48 closely surrounds flange 17 of the spindle, and seals 17a are provided between these parts to prevent entry of dirt at this point. The front of shaft 48 carries a rotary tool head in the form of a flange 60, which is shown as mounting two tool holders 62 and 64, but which has additional capability of mounting up to four tool holders.

Tool holder 62 is mounted for radial movement on flange 60 by a bed 70 having a radially extending recess the cross-sectional shape of which is shown in FIG. 4. The bed 70 is mounted on flange 60 by bolts 72 which also hold in place retaining elements 74. The elements 74 have inwardly sloping side surfaces retaining the similarly sloping side surfaces of the tool holder 62. The tool holder has two radially extending bores which receive strong compression springs 76, acting between the bottom of the bores and an end plate 78 at the outer end of bed 70. Tool holder 62 has a front recess holding tool 80, this being held in place by top plate 82. The radial position of the tool holder is determined by an actuating arm 84 which extends rearwardly from the tool holder, through a radial slot in flange 60, to engage a wedge type operating mechanism to be described.

The wedge mechanism includes a collar 85 which is slidable axially on the hollow shaft 48, being prevented from rotation on this shaft by the inwardly projecting part of a screw pin 86, which projecting part is movable in an axial slot 87 in the hollow shaft. Welded to the collar is an annular member 90, having a machined circular recess which receives the inner part of a slip ring 92, held in place by a screwed on annular plate 94. The front portion of collar 85 has an axial recess which receives the base of a wedging member 95, which has an inwardly sloping surface disposed at about 30° to the axis of the machine, and which engages the rear end portion of the actuating arm 84. Since the springs 76 urge the tool holder 62 downwardly with a strong force, the position of the tool holder is determined by the axial position of the collar 85 and wedge 95. Axial movement of the collar is caused by the slip ring 92 which has an enlarged side portion at each side of the machine receiving the piston rod end of a hydraulic cylinder 96 (See FIG. 1). The rear end of each hydraulic cylinder 96 is located in a recess in the back plate 40. The hydraulic cylinders 96 are connected into a hydraulic circuit including a valve giving close control of hydraulic flow, so that during operation the cylinders, which are double acting, can be retracted gradually to withdraw the collar 85, and the wedge 95, allowing the tool holder 62 to advance radially under the influence of springs 76. Tool 80 is adjusted in position so that with cylinders 96 fully retracted the tool is at the required innermost portion; there is thus no need to watch the facing operation to prevent over-run. An adjustable stop (not shown) is provided to limit forward movement of the collar 85, so that after a facing operation has been performed the tool is only retracted to a predetermined amount, and there is no waste in the feeding cycle for the next operation.

The flange 60 also mounts the fixed tool holder 64 which includes block 100 held by screws onto the flange 60, the position of the block being adjustable. A chamfering tool 102 is mounted in block 100 so that its angled outer edge is in correct radial position for operating on the outer corner of the shoulder of pipe P.

The machine shown is intended to be used with a trolley carrying an internal combustion engine driving a hydraulic pump which supplies fluid both to the hydraulic motor 56, and to the hydraulic feeding cylinders 96. The trolley also includes the necessary hydraulic valves including a fine metering valve for giving the desired slow rate of contraction of cylinders 96 during the facing operation. The trolley may also provide a support for hook H.

In operation, the machine is suspended from hook H while the adapter 14 is threaded onto the pipe P, with locking nut 21 withdrawn and with ball 29 engaging detent groove 29a in the adapter to hold the teeth of clutch ring 24 clear of those at the end of spindle 16. When the adapter has been firmly screwed into place, locking nut 21 is rotated to move the clutch ring 24 forwards so that the spindle 16 is locked firmly, axially and rotatably, onto the adapter. These operations are performed with the hydraulic cylinders 96 expanded sufficiently so that wedge 95 holds the tool holder in an outer position. With the parts in place, the operator can allow fluid to flow to the hydraulic motor 56, causing the tool head to rotate, and simultaneously the cylinder 96 can be retracted to advance the tool holder 62. The operator may observe the tool to gauge the correct axial position of this, which is adjusted by the adjustment nut 35 to give a suitable cut, or may preset adjustment nut 35 according to its gauge so that he need not observe the cutting. During the facing operation, the supply of hydraulic fluid to cylinder 96 is controlled to give a correct radial feed for the facing tool 82. The tool is always adjusted in position so that when the cylinder 96 is fully retracted the tool is in the correct radial position relative to the pipe.

After facing, the facing tool is withdrawn sufficient to clear the seal face by expanding cylinders 96, and the adjustment nut 35 is used to move the tool head forwards until the chamfering tool 102 engages the corner of the shoulder to produce a suitable chamfer. There is no need to stop rotation of the tool head between these operations.

FIG. 5 shows an alternative form of adapter which can be used for facing the box ends of drill pipes P' with the identical machine. To change the adapter, the locking nut 20 and clutch ring 24 are unscrewed from the end of the adapter, the adapter being then replaced by the externally threaded adapter 14' shown in FIG. 5. This adapter has a flange surface 14b' which corresponds in position to surface 14b of the pin end adapter and which locates against flange 17 of the spindle, bringing the tool 80 into suitable position for facing the seal face of the pipe end with minimal adjustment of the machine. As will be seen by referring to FIG. 5, the machining operation can thus be performed on the box end seal face of the drill pipe in manner similar to that performed on the shoulder of the pin end.

As mentioned, the flange 60 of the tool head has the facility for mounting additional tools, for example axially movable reamers.

It is to be noted that the adapters used in this machine are not necessarily screw threaded, and for example an expansion mandrel could be used for engaging in the end of an unthreaded pipe.

I claim:

1. Apparatus for machining pipe seal faces, comprising:
    spindle means including an adapter, said adapter having a forward end arranged to engage a pipe so as to hold said spindle means axially and radially solid with the pipe,
    a sleeve axially adjustable on said spindle means without rotation,
    bearing means carried by said sleeve and supporting a hollow shaft carrying a rotary tool head,
    a tool holder carried by said tool head and movable radially thereof under control of feeding means,
    support means solid with said sleeve and extending outwardly therefrom at the rear end of the bearing means, said support means carrying an end of said feeding means,
    said spindle means including a threaded rear end carrying an adjustment nut engaging the rear end of the sleeve to cause axial adjustment thereof, spring means being provided between the front end of the sleeve and the spindle means for holding the sleeve against the nut,
    a rotary drive motor mounted on said support means and arranged to rotate said tool carrying head; and
    an axially movable clutch ring keyed to the adapter and positioned between spindle locking means and the end of the spindle.

2. Apparatus according to claim 1, wherein said rotary drive motor projects forwardly from said support means, said motor having a pinion at the rear end thereof nearest the support means, said pinion driving a gear ring on the rear end of said hollow shaft.

3. Apparatus according to claim 1, wherein said feeding means includes a collar surrounding and rotatable with said hollow shaft and movable there along by means of a non-rotatable slip ring, said slip ring being connected to said support means by hydraulic cylinder means, the feeding means also comprising interconnecting means between the tool holder and the collar for converting axial movement of the collar into radial movement of the tool holder.

4. Apparatus for machining pipe seal faces, comprising:-
    spindle means including an adapter, said adapter having a forward end arranged to engage a pipe end so as to hold said spindle means solid with the pipe,
    support means non-rotatably held on said spindle means,
    bearing means carried by said spindle means and in turn supporting a hollow shaft carrying a rotary tool head, said tool head having a tool holder movable radially thereof,
    drive means mounted on said support means for rotating said rotary tool head,
    a motion transmitting member rotatable with said hollow shaft and movable axially relative thereto,
    a non-rotatable slip ring engaging with said motion transmitting member for causing axial movement thereof, said slip ring being connected to said support means by hydraulic cylinder means so that said hydraulic cylinder means can cause axial movement of said member, and
    a mechanism interconnecting said member with the tool holder so that axial movement of said member is converted into radial movement of the tool holder.

5. Apparatus according to claim 4, wherein said motion transmitting member is a collar surrounding said rotatable shaft.

6. Apparatus according to claim 5, wherein said mechanism for converting movement of the collar into movement of the tool holder includes interengaging wedge surfaces carried by the collar and the tool holder, the surfaces being arranged so that forward movement of the collar causes outwards movement of the tool holder, and wherein there are provided spring means causing inward movement of the tool holder for surfacing a pipe end.

7. Apparatus according to claim 1, wherein said spindle means includes a hollow spindle surrounding an adapter, said adapter having a screw threaded end portion arranged to engage the threads of a threaded drill pipe, and being rotatable in said spindle for screwing onto a non-rotating pipe, said spindle means further comprising locking means at the rear end of the spindle for solidly locking the adapter axially and radially within the spindle when the adapter is in place on a pipe.

8. Apparatus for machining the seal faces of threaded drill pipes comprising:
   an adapter having a shank and a screw threaded end suitable for engaging with the threaded end of a drill pipe,
   a spindle closely surrounding said adapter and arranged to be locked thereto by locking means at the rear end of the spindle when the adapter has been threaded onto a pipe end,
   a rotary tool head rotatably supported by said spindle and having a tool holder carrying a tool for machining a pipe end, means being provided for rotating said head on said spindle,
   wherein said locking means comprise a locking nut threaded onto a screw thread at the rear end of said adapter, an axially movable clutch ring keyed to the adapter and positioned between said locking nut and the end of the spindle, said clutch ring and the rear end of the spindle having cooperating teeth to prevent rotation of the clutch ring and adapter relative to the spindle when the clutch ring is held against the end of the spindle by the locking nut.

9. Apparatus according to claim 8, further comprising a sleeve axially movable on the spindle and keyed thereto, said sleeve rotatably mounting said tool carrying head, said spindle having a screw threaded rear end carrying an adjustment nut engaging with the rear end of the sleeve for axially adjusting the position of the sleeve on the spindle, spring means being provided between the front end of the sleeve and the spindle to hold the sleeve against the adjustment nut.

10. Apparatus for machining pipe seal faces, comprising:
    spindle means including an adapter, said adapter having a forward end arranged to engage a pipe so as to hold said spindle means solid with the pipe,
    a sleeve axially adjustable on said spindle means without rotation,
    bearing means carried by said sleeve and supporting a hollow shaft carrying a rotary tool head for carrying a tool capable of machining a pipe end, and
    means for rotating said rotary tool head, wherein the rear end of said spindle means has a screw thread carrying an adjustment nut for moving said sleeve axially on said spindle means for locating the tool relative to a pipe end, gauge means being provided showing the position of the adjustment nut so that said gauge means may be used to determine the position of the tool relative to the pipe thread; and
    locking means comprising a locking nut threaded onto a screw thread at the rear end of the adapter, an axially movable clutch ring keyed to the adapter and positioned between said locking nut and the end of the spindle, said clutch ring and the rear end of the spindle having cooperating teeth to prevent rotation of the clutch ring and adapter relative to the spindle when the clutch ring is held against the end of the spindle by the locking nut.

11. Apparatus according to claim 10, wherein said sleeve is urged backwards against said adjustment nut by spring means acting between the sleeve and the spindle means.

* * * * *